(12) United States Patent
Tieman

(10) Patent No.: US 11,598,292 B1
(45) Date of Patent: Mar. 7, 2023

(54) ENGINE SYSTEM

(71) Applicant: Michael Anthony Tieman, Las Vegas, NV (US)

(72) Inventor: Michael Anthony Tieman, Las Vegas, NV (US)

(*) Notice: Subject to any disclaimer, the term of this patent is extended or adjusted under 35 U.S.C. 154(b) by 167 days.

(21) Appl. No.: 17/158,181

(22) Filed: Jan. 26, 2021

Related U.S. Application Data

(60) Provisional application No. 62/970,759, filed on Feb. 6, 2020.

(51) Int. Cl.
| | | |
|---|---|---|
| *F02M 26/04* | (2016.01) | |
| *F02M 26/01* | (2016.01) | |
| *F01P 1/02* | (2006.01) | |
| *F01P 1/04* | (2006.01) | |
| *F01P 1/08* | (2006.01) | |

(52) U.S. Cl.
CPC ............ *F02M 26/01* (2016.02); *F02M 26/04* (2016.02); *F01P 1/02* (2013.01); *F01P 1/04* (2013.01); *F01P 1/08* (2013.01); *F01P 2001/023* (2013.01)

(58) Field of Classification Search
CPC ........ F02M 26/01; F02M 26/04; F02M 31/20; F02M 35/10242; F02M 35/10268; F01P 1/02; F01P 1/04; F01P 1/08; F01P 2001/023; F01P 5/00; F01P 5/02; F01P 2060/12; F01P 2060/02; F02B 29/04
See application file for complete search history.

(56) References Cited

U.S. PATENT DOCUMENTS

| | | | | |
|---|---|---|---|---|
| 4,096,697 | A * | 6/1978 | Treuil | F02B 37/00 60/599 |
| 5,103,645 | A * | 4/1992 | Haring | F02B 41/06 123/68 |
| 6,216,647 | B1 * | 4/2001 | Bailey | F02B 71/04 123/46 R |
| 11,428,179 | B1 * | 8/2022 | Kurtz | F02D 13/0215 |
| 2012/0255296 | A1 * | 10/2012 | Phillips | F02B 33/44 60/517 |
| 2014/0261325 | A1 * | 9/2014 | Scuderi | F02B 33/22 123/445 |
| 2022/0154658 | A1 * | 5/2022 | Owen | F02B 29/04 |

FOREIGN PATENT DOCUMENTS

WO WO-2018115863 A1 * 6/2018 ............ F01N 11/002

* cited by examiner

*Primary Examiner* — Grant Moubry
*Assistant Examiner* — James G Moubry
(74) *Attorney, Agent, or Firm* — Ted Masters

(57) ABSTRACT

An engine system which combines an internal combustion engine with a unique air-cooling system. The air-cooling system includes a cooling cylinder(s) which is disposed in the engine block. Input air is expanded through the cooling cylinder from the intake manifold directly to the exhaust manifold. No high compression or combustion takes place in the cooling cylinder. Heat from the cooling cylinder is transferred to the input air, and the heated air is then exhausted to the internal combustion engine exhaust stream where it is used to help power a turbocharger.

10 Claims, 3 Drawing Sheets

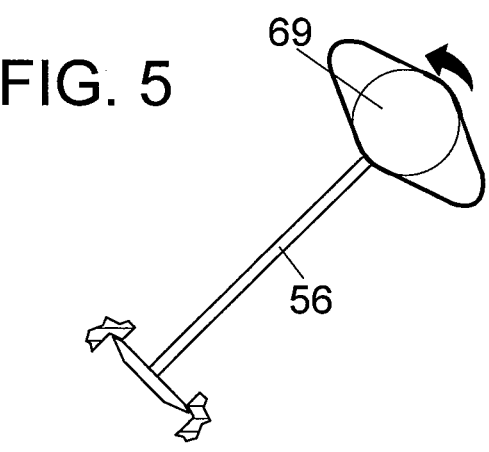
FIG. 5
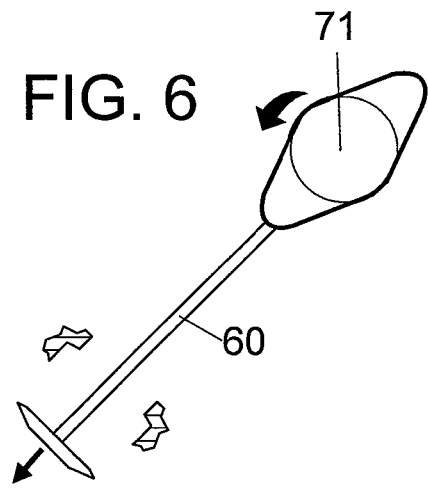
FIG. 6
FIG. 7
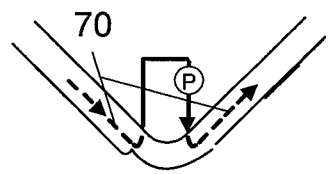

ENGINE SYSTEM

CROSS REFERENCE TO RELATED APPLICATION

This application claims the filing benefit under 35 U.S.C. § 119(e) of U.S. Provisional Application No. 62/970,759, filed Feb. 6, 1920, which is hereby incorporated by reference.

TECHNICAL FIELD

The present invention pertains generally to internal combustion engines, and more particularly to an engine system which includes an internal combustion engine which is combined with an air-cooling system.

BACKGROUND OF THE INVENTION

The current method for maintaining an internal combustion engine at the manufacturer's optimum operating temperature is a closed circulating liquid coolant system. Typically, these closed systems circulate a liquid inside the internal combustion engine's block and around the outside of the combustion cylinders. The circulating liquid is contained in passageways in the block and is pumped to an external heat exchanger known as a "radiator". The radiator (radiating the heat to the atmosphere) cools the liquid and the liquid is then re-circulated back to the internal combustion engine. The engine's temperature is controlled with a liquid thermostat that opens and closes to maintain the optimum temperature.

Other engine designs use direct air cooling to keep the internal combustion engine at the manufacturer's recommended operating temperature. Ambient air is used to cool the engine. In these designs direct air is used to eliminate the water/air heat exchanger. The air cooling is done exclusively externally of engine.

In both of the above examples, the heat energy transferred away from the engine is transferred to the atmosphere and lost.

BRIEF SUMMARY OF THE INVENTION

The present invention is directed to an engine system which combines an internal combustion engine with a unique air-cooling system. The air-cooling system includes a cooling cylinder(s) which is disposed in the engine block. Input air is expanded through the cooling cylinder from the intake manifold directly to the exhaust manifold. No high compression or combustion takes place in the cooling cylinder. Heat from the cooling cylinder is transferred to the input air, and the heated air is then exhausted to the internal combustion engine exhaust stream where it is used to help power a turbocharger.

The cooling cylinder(s) concept serves to capture engine heat and exhaust gas flow that would normally be lost to the atmosphere, and direct that heat and gas flow to a turbocharger resulting in enhanced engine economy.

In an embodiment, an engine system has an internal combustion engine which includes (1) an engine block, (2) an intake manifold connected to the engine block, (3) an exhaust manifold connected to the engine block, (4) a crankshaft connected to the engine block, (5) at least one combustion cylinder disposed in the engine block, the combustion cylinder having an intake port adjacent the intake manifold, an intake valve, an exhaust port adjacent the exhaust manifold, and an exhaust valve. The combustion cylinder slidably receives a piston which is connected to the crankshaft. The engine system, further has an air-cooling system which includes at least one cooling cylinder disposed in the engine block, the cooling cylinder having an intake port adjacent the intake manifold, an intake valve, an exhaust port adjacent the exhaust manifold, and an exhaust valve. The cooling cylinder slidably receives a cooling piston which is connected to the crankshaft. The cooling piston has neither a high compression stroke nor a combustion stroke.

In accordance with another embodiment, the cooling cylinder is purposely configured to pass input air from the intake manifold to the exhaust manifold without combustion.

In accordance with another embodiment, the cooling piston does not have high compression piston rings.

In accordance with another embodiment, the air-cooling system purposely does not have a fuel input or a spark plug.

In accordance with another embodiment, the intake valve and the exhaust valve of the internal combustion engine open and close at a given rate. The intake valve and the exhaust valve of the air-cooling system open and close at twice the given rate.

In accordance with another embodiment, the input air passing through the cooling cylinder lowers the temperature of the engine block.

In accordance with another embodiment, the exhaust manifold is connected to a turbocharger which compresses input air entering the intake manifold of the internal combustion engine.

In accordance with another embodiment, an input air cooler is disposed between the turbocharger and the intake manifold.

In accordance with another embodiment, the compressed input air exerts a force on the cooling piston.

In accordance with another embodiment, the internal combustion engine includes a circulatory fluid cooling system which does not have a radiator.

Other embodiments, in addition to the embodiments enumerated above, will become apparent from the following detailed description, taken in conjunction with the accompanying drawings, which illustrate, by way of example, the principles of the engine system.

BRIEF DESCRIPTION OF THE DRAWINGS

FIG. 5 is an enlarged view of a cooling system cam engaging a cooling system intake valve;

FIG. 6 is an enlarged view of another cooling system cam engaging a cooling system exhaust valve; and, FIG. 7 is a view of area 7 of FIG. 2.

DETAILED DESCRIPTION OF THE INVENTION

Figure 1:
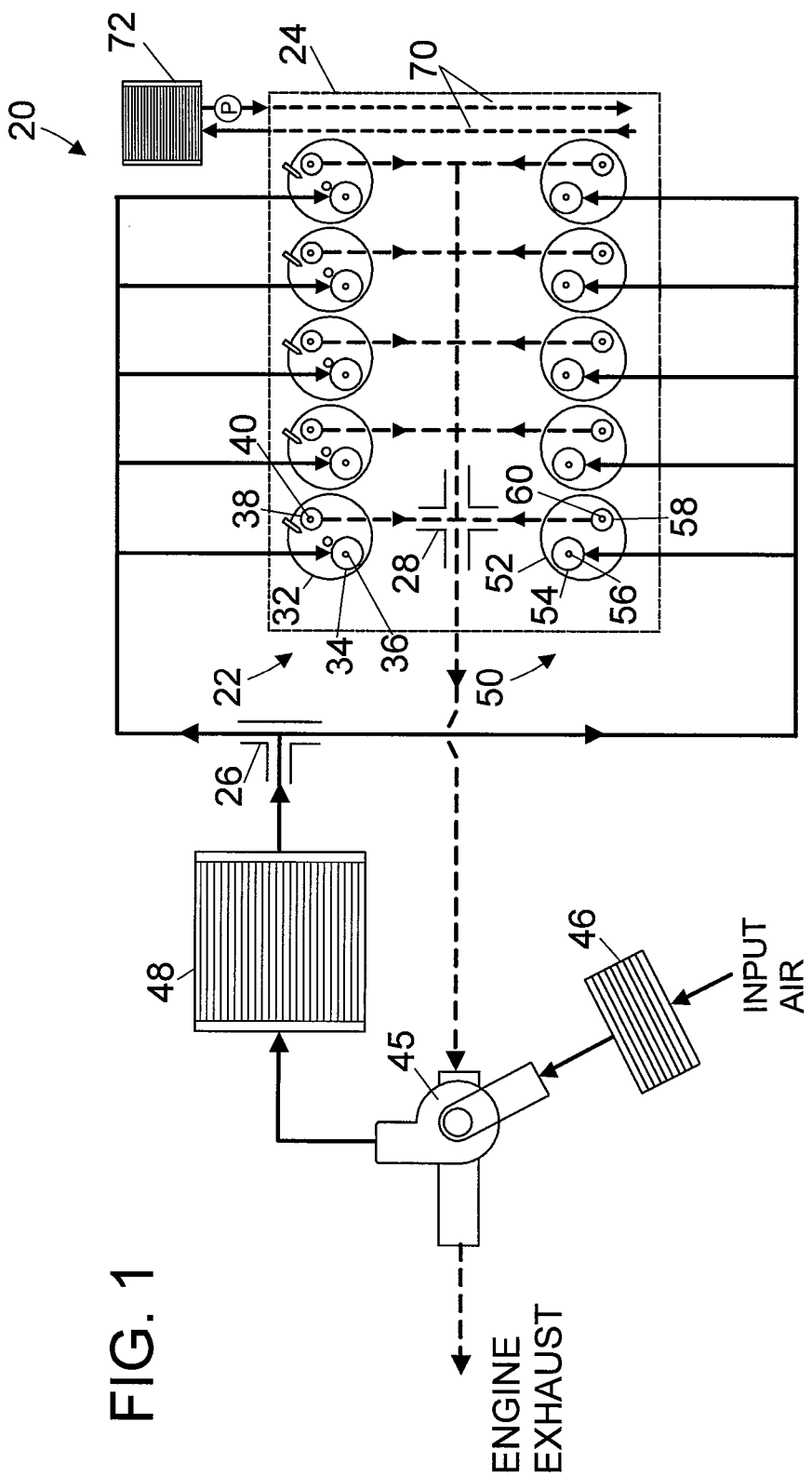
FIG. 1 is a functional top view of an engine system in accordance with the present invention.
Figure 2:
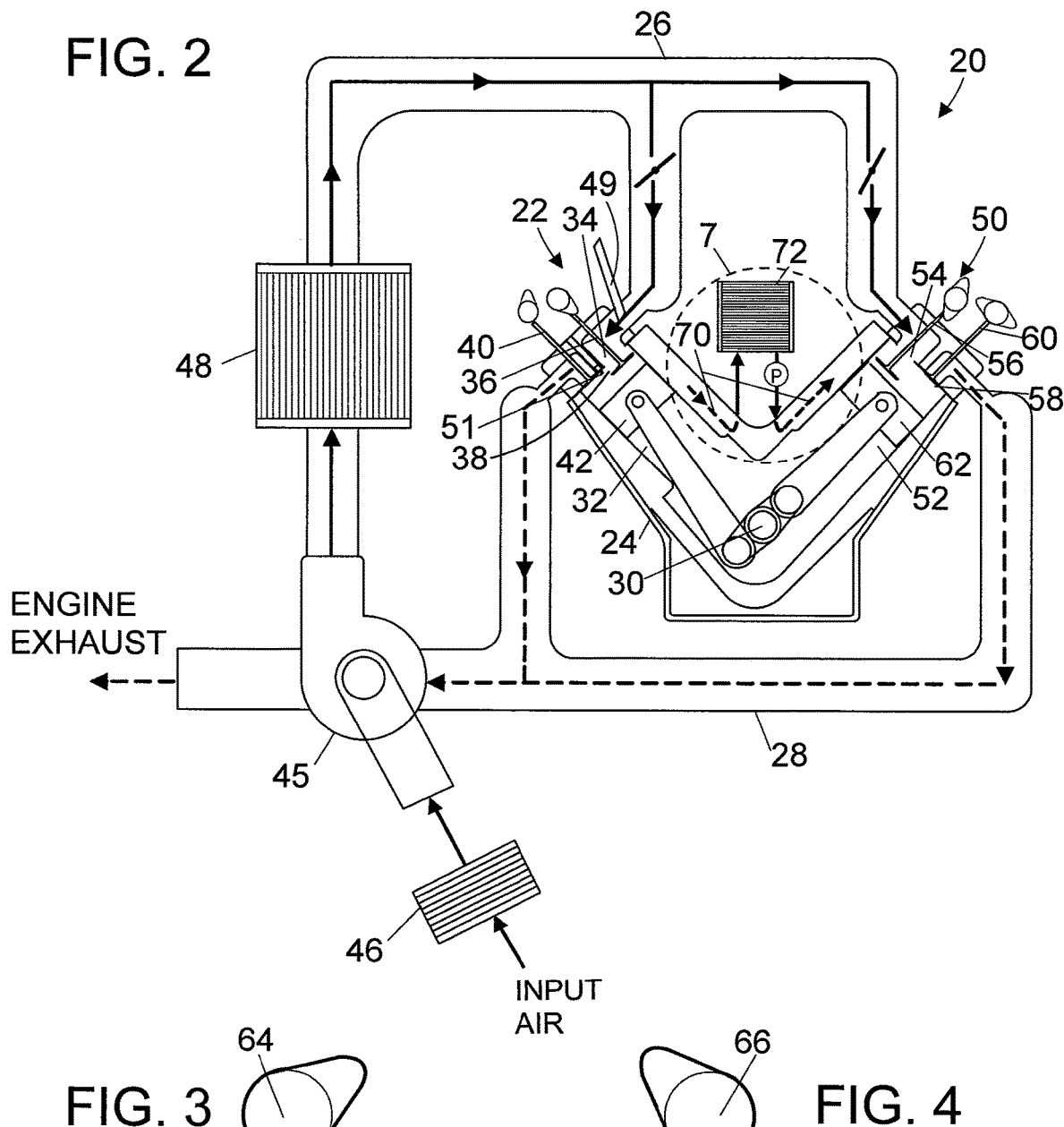
FIG. 2 is a functional front cutaway view of the engine system.

Referring initially to FIGS. 1 and 2, there are illustrated functional top and front cutaway views respectively of an engine system, generally designated as 20 (also referred to herein as engine 20). Engine 20 includes an internal combustion engine 22 which has (1) an engine block 24, (2) an intake manifold 26 connected to engine block 24, (3) an exhaust manifold 28 connected to said engine block 24, (4) a crankshaft 30 connected to engine block 24, (5) at least one combustion cylinder 32 disposed in engine block 24, combustion cylinder 32 has an intake port 34 adjacent intake manifold 26, an intake valve 36, an exhaust port 38 adjacent exhaust manifold 28, and an exhaust valve 40. Combustion cylinder 32 slidably receives a piston 42 which is connected to crankshaft 30 by a connecting rod. It is also noted that in FIG. 1 intake manifold 26 and exhaust manifold 28 have been shown in fragmented form for drawing simplicity. Also in the shown embodiment exhaust manifold 28 is connected to a turbocharger 45 which compresses input air entering intake manifold 26 of internal combustion engine 22.

In the shown embodiment internal combustion engine 22 is a conventional four stroke gasoline engine (intake, compression, combustion, exhaust). An input air filter 46 is disposed before turbocharger 45. An input air cooler 48 is disposed between turbocharger 45 and intake manifold 26. During the intake stroke pressurized input air from turbocharger 45 enters combustion cylinder 32 via intake manifold 26 and intake port 34 when intake valve 36 is open. Gasoline (fuel) is injected into combustion cylinder 32 by a fuel injector 49. During the compression stroke the air-gasoline mixture is compressed. During the combustion stroke the air-gasoline mixture is ignited by a spark plug 51. During the exhaust stroke the burned mixture exits combustion cylinder 32 via exhaust port 38 when exhaust valve 40 is open. It may also be appreciated however that the principles of the present invention can be applied to two stroke engines, diesel engines, and supercharged engines.

Engine 20 further includes an air-cooling system 50. Air-cooling system 50 includes at least one cooling cylinder 52 disposed in engine block 24. Cooling cylinder 52 has an intake port 54 connected to intake manifold 26, an intake valve 56, an exhaust port 58 connected to exhaust manifold 28, and an exhaust valve 60. Cooling cylinder 52 slidably receives a cooling piston 62 which is connected to crankshaft 30. Cooling piston 62 has neither a compression stroke nor a combustion stroke. That is, cooling cylinder 52 is purposely configured to pass input air from intake manifold 26 to exhaust manifold 28 without significant compression or combustion occurring. By doing so, engine block 24 is air-cooled by the air which expands through cooling cylinder 52. During the intake stroke pressurized input air from turbocharger 45 enters cooling cylinder 52 via intake manifold 26 and intake port 54 when intake valve 56 is open. Since the input air is pressurized by turbocharger 45, it will expand in cooling cylinder 32 and provide expansion cooling. During the exhaust stroke the input air exits cooling cylinder 52 via exhaust port 58 when exhaust valve 60 is open. During the exhaust stroke the expanded air retains some of the heat from the cylinder wall and engine block. During the exhaust stroke air is moved out of the cylinder which compresses it to the current pressure of the exhaust gas manifold from the internal combustion engine where the air is exiting. The compression of the expanded air is largely done in the cylinder head. The cylinder head is thermally isolated from the block via a non-conductive fiber head gasket. The intake stroke and exhaust stroke are then repeated over and over.

Because of this more frequent cycle, cooling cylinders 52 provide additional heat and roughly twice as much gas flow to turbocharger 45 than do combustion cylinders 32, thereby increasing turbocharger 45 performance. It is also noted that the input air passing though cooling cylinder 52 serves to lower the temperature of engine block 24, thereby providing air cooling. Also the compressed input air from turbocharger 45 exerts a force upon cooling piston 62 thereby increasing engine efficiency.

Conventional internal combustion engine pistons typically have two high compression piston rings which seal the piston against the cylinder wall to increase compression. To reduce friction, in an embodiment of the present engine 20 cooling piston 62 do not have high compression piston rings in order to reduce piston friction. To prevent input air from entering the engine crankcase, other types of sealing can be utilized, such as O-rings. Additionally, the oil scavenger piston rings which are on conventional engine piston can be retained on cooling piston 62. Also, it is noted that air-cooling system 50 purposely does not have a fuel input or a spark plug. These elements are unneeded and unwanted since air-cooling system 50 has neither a compression stroke nor a combustion stroke.

In the shown embodiment there are five combustion cylinders 32 and five cooling cylinders 52 arranged in a V-10 configuration. It may be appreciated however that other numbers of combustion cylinders 32 and cooling cylinders 52 could be used; such as 1-4, 6, or more could be utilized. Moreover, the number of combustion cylinders 32 and the number of cooling cylinders 52 do not necessarily have to be the same. For example there could be four combustion cylinders 32 and three cooling cylinders 52. Also, in the shown embodiment the combustion cylinders 32 are arranged in one bank on one side of engine 20, and the cooling cylinders 52 are arranged in another bank on the opposite side of engine 20. It is noted however that different cylinder arrangements are also possible. For example combustion cylinders 32 could be interleaved with cooling cylinders 52 in both banks, or both combustion cylinders 32 and cooling cylinders 52 could be disposed in a single bank in either a separated or interleaved configuration. Of course both the mechanical balance and manifold plumbing would necessarily need to be considered in all configurations. Also, in the shown embodiment combustion cylinders 32 and cooling cylinders 52 are the same size (have the same cylinder diameter). It may be appreciated however that the cooling cylinders 52 could be either larger or smaller than the combustion cylinders 32.

In FIGS. 1 and 2 it is noted that engine 20 includes a circulatory fluid cooling system which includes passageways 70 within engine block 24 in which a fluid circulates (water, water plus additives, another liquid, air, or another gas). The circulatory fluid cooling system routes fluid throughout engine block 24 where it absorbs combustion heat from the combustion cylinder 32, and is cooled by the cooling cylinder 52. The circulation is provided by a pump P (or blower). In the shown embodiment the fluid also circulates through a radiator 72 (heat exchanger) where it is cooled by ambient air. It is envisioned during transient or high engine loads a radiator may be required. However, it is noted that in some embodiments of the present engine 20 the circulatory cooling system does not include a radiator 72, but only circulates the cooling fluid within engine block 24. Refer to FIG. 7.

Figure 3:
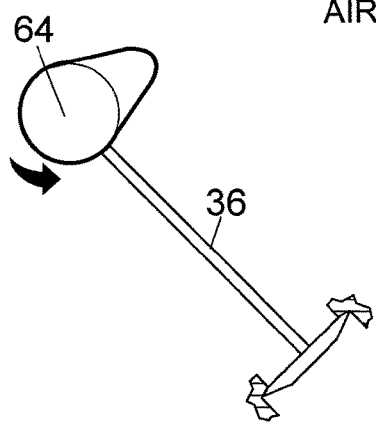
FIG. 3 is an enlarged view of an internal combustion engine intake cam engaging an internal combustion engine intake valve.
Figure 4:
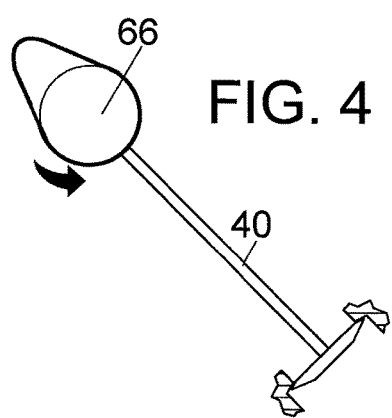
FIG. 4 is an enlarged view of an internal combustion engine exhaust cam engaging an internal combustion engine exhaust valve.

FIG. 3 is an enlarged view of an internal combustion engine intake cam 64 engaging internal combustion engine intake valve 36, and FIG. 4 is an enlarged view of an internal combustion engine exhaust cam 66 engaging internal combustion engine exhaust valve 40. Both intake cam 64 and exhaust cam 66 have one lobe. In the shown four stroke internal combustion engine 22, intake valve 36 and exhaust valve 40 open and close at a given rate as determined by intake cam 64 and exhaust cam 66. The intake cam 64 and exhaust cam 66 completely rotate once for every two rotations of crankshaft 30. So intake valve 36 and exhaust valve 40 open and close once for every two rotations of crankshaft 30.

FIG. 5 is an enlarged view of a cooling system intake cam 69 engaging cooling system intake valve 56, and FIG. 6 is an enlarged view of a cooling system exhaust cam 71 engaging cooling system exhaust valve 60. Both intake cam 69 and exhaust cam 72 have two contrapositioned lobes. As such in the shown cooling system 50, the intake valve 56 and exhaust valve 60 open and close at twice the given rate of the internal combustion engine intake valve 36 and exhaust valve 40. It is noted that the camshaft of internal combustion engine 22, and the camshaft of cooling system 50 rotate at the same rate. It may be appreciated that another way of achieving the faster valve opening and closing rate of cooling system intake valve 56 and exhaust valve 60, would be to use single lobe cams but gear their camshaft to rotate at twice the speed.

The embodiments of the engine system described herein are exemplary and numerous modifications, combinations, variations, and rearrangements can be readily envisioned to achieve an equivalent result, all of which are intended to be embraced within the scope of the appended claims. Further, nothing in the above-provided discussions of the engine system should be construed as limiting the invention to a particular embodiment or combination of embodiments. The scope of the invention is defined by the appended claims.

I claim:

1. An engine system, comprising:
   an internal combustion engine including;
      an engine block;
      an intake manifold connected to said engine block;
      an exhaust manifold connected to said engine block;
      a crankshaft connected to said engine block;
      at least one combustion cylinder disposed in said engine block, said combustion cylinder having an intake port adjacent said intake manifold, an intake valve, an exhaust port adjacent said exhaust manifold, and an exhaust valve;
      said combustion cylinder slidably receiving a piston which is connected to said crankshaft;
   an air-cooling system including;
      at least one cooling cylinder disposed in said engine block, said cooling cylinder having an intake port adjacent said intake manifold, an intake valve, an exhaust port adjacent said exhaust manifold, and an exhaust valve;
      said cooling cylinder slidably receiving a cooling piston which is connected to said crankshaft; and,
      said cooling piston not having a combustion stroke;
   said intake valve and said exhaust valve of said internal combustion engine opening and closing at a given rate; and,
   said intake valve and said exhaust valve of said air-cooling system opening and closing at twice said given rate.

2. An engine system, comprising:
   an internal combustion engine including;
      an engine block;
      an intake manifold connected to said engine block;
      an exhaust manifold connected to said engine block;
      a crankshaft connected to said engine block;
      at least one combustion cylinder disposed in said engine block, said combustion cylinder having an intake port adjacent said intake manifold, an intake valve, an exhaust port adjacent said exhaust manifold, and an exhaust valve;
      said combustion cylinder slidably receiving a piston which is connected to said crankshaft;
   an air-cooling system including;
      at least one cooling cylinder disposed in said engine block, said cooling cylinder having an intake port adjacent said intake manifold, an intake valve, an exhaust port adjacent said exhaust manifold, and an exhaust valve;
      said cooling cylinder slidably receiving a cooling piston which is connected to said crankshaft,
      said cooling piston not having a combustion stoke;
      said cooling cylinder purposely configured to pass input air from said intake manifold to said exhaust manifold without combustion;
      said air-cooling system purposely not having a fuel input or a spark plug;
   said intake valve and said exhaust valve of said internal combustion engine opening and closing at a given rate;
   said intake valve and said exhaust valve of said air-cooling system opening and closing at twice said given rate;
   said input air passing through said cooling cylinders lowering a temperature of said engine block;
   said exhaust manifold connected to a turbocharger which compresses input air entering said intake manifold of said internal combustion engine;
   an input air cooler disposed between said turbocharger and said intake manifold; and,
   said compressed input air exerting a force upon said cooling pistons.

3. An engine system, comprising:
   an internal combustion engine including;
      an engine block;
      an intake manifold connected to said engine block;
      an exhaust manifold connected to said engine block;
      a crankshaft connected to said engine block;
      at least one combustion cylinder disposed in said engine block, said combustion cylinder having an intake port adjacent said intake manifold, an intake valve, an exhaust port adjacent said exhaust manifold, and an exhaust valve;
      said combustion cylinder slidably receiving a piston which is connected to said crankshaft;
   an air-cooling system including;
      at least one cooling cylinder disposed in said engine block, said cooling cylinder having an intake port adjacent said intake manifold, an intake valve, an exhaust port adjacent said exhaust manifold, and an exhaust valve;
      said cooling cylinder slidably receiving a cooling piston which is connected to said crankshaft; and,
      said intake valve and said exhaust valve of said internal combustion engine opening and closing at a given rate; and,
      said intake valve and said exhaust valve of said air-cooling system opening and closing at twice said given rate.

4. The engine system according to claim 3, further including:
   said air-cooling system purposely not having a fuel input or spark plugs.

5. The engine system according to claim 3, further including:
- said internal combustion engine including a circulatory fluid cooling system; and,
- said circulatory fluid cooling system not including a radiator.

6. The engine system according to claim 3, further including:
- said cooling cylinder purposely configured to pass input air from said intake manifold to said exhaust manifold without combustion.

7. The engine system according to claim 6, further including:
- said input air passing through said cooling cylinder lowering a temperature of said engine block.

8. The engine system according to claim 3, further including:
- said exhaust manifold connected to a turbocharger which compresses input air entering said intake manifold of said internal combustion engine.

9. The engine system according to claim 8, further including:
- an input air cooler disposed between said turbocharger and said intake manifold.

10. The engine system according to claim 8, further including:
- said compressed input air exerting a force upon said cooling piston.

* * * * *